US009463121B1

(12) United States Patent
Maeshiro et al.

(10) Patent No.: US 9,463,121 B1
(45) Date of Patent: Oct. 11, 2016

(54) WHEELCHAIR ASSEMBLY AND SYSTEM FOR INGRESS/EGRESS TO A VEHICLE USING A DOOR OF A VEHICLE AS SUPPORT

(71) Applicant: Honda Motor Co., Ltd., Minato-ku, Tokyo (JP)

(72) Inventors: Shinji Maeshiro, Cypress, CA (US); James Lee, Gardena, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/692,456

(22) Filed: Apr. 21, 2015

(51) Int. Cl.
| | | |
|---|---|---|
| *A61G 3/04* | (2006.01) |
| *A61G 5/08* | (2006.01) |
| *A61G 5/10* | (2006.01) |
| *B60N 2/24* | (2006.01) |
| *B60N 2/32* | (2006.01) |
| *B60N 2/64* | (2006.01) |
| *B60N 2/06* | (2006.01) |
| *B60J 5/04* | (2006.01) |

(52) U.S. Cl.
CPC ............... *A61G 5/08* (2013.01); *A61G 5/1067* (2013.01); *B60J 5/0486* (2013.01); *B60N 2/06* (2013.01); *B60N 2/245* (2013.01); *B60N 2/32* (2013.01); *B60N 2/64* (2013.01); *A61G 2005/0875* (2013.01); *A61G 2005/1083* (2013.01)

(58) Field of Classification Search
CPC .... A61G 5/1067; A61G 3/0209; A61G 3/06; B60J 5/0486; B60N 2/06; B60N 2/245; B60N 2/32; B60N 2/64
USPC ............................ 414/541, 921; 297/DIG. 4
See application file for complete search history.

(56) References Cited

U.S. PATENT DOCUMENTS

| 2,038,062 A | * | 4/1936 | Simpson | ................. E05B 85/12 292/167 |
| 2,650,725 A | * | 9/1953 | Hoyer | ....................... A61G 3/06 212/231 |
| 2,792,951 A | * | 5/1957 | White | ....................... A61G 3/06 297/344.24 |
| 3,172,551 A | * | 3/1965 | Wolfe | ....................... A61G 3/06 248/281.11 |
| 3,677,424 A | * | 7/1972 | Anderson | ............. A61G 7/1017 414/550 |
| 3,865,427 A | * | 2/1975 | Delany | ..................... A61G 3/06 280/30 |
| 4,155,587 A | | 5/1979 | Mitchell | |
| 4,170,368 A | * | 10/1979 | Southward | ............... A61G 5/00 280/250.1 |

(Continued)

FOREIGN PATENT DOCUMENTS

| GB | 2192369 | 1/1988 |
| WO | 0054717 | 9/2000 |

*Primary Examiner* — J. Allen Shriver, II
*Assistant Examiner* — Brian Cassidy
(74) *Attorney, Agent, or Firm* — Arent Fox LLP

(57) ABSTRACT

A entry and exit assist system for a vehicle has a mounting slot formed within a door of the vehicle. A wheelchair has a set of wheels and a seat coupled to the set of wheels, wherein the set of wheels are one of detachable from or foldable under the wheelchair. A supporting connector is coupled to the wheelchair. The supporting connector slides into and engages the mounting slot holding the wheelchair above a ground area when the set of wheels are one of detached from or folded under the wheelchair. A seatback is slideably mounted on a track in the vehicle. Closing the door with the supporting connector engaging the mounting slot and holding the wheelchair above a ground area positions the wheelchair in the vehicle. The seatback provides back support for a user of the wheelchair.

18 Claims, 5 Drawing Sheets

(56) References Cited

U.S. PATENT DOCUMENTS

| | | | | |
|---|---|---|---|---|
| 4,226,462 A * | 10/1980 | Wellett | B60N 2/2836 296/68 |
| 4,236,860 A * | 12/1980 | Gottlieb | B60R 9/0426 414/462 |
| 4,278,387 A * | 7/1981 | Seguela | A61G 3/06 280/250.1 |
| 4,299,527 A * | 11/1981 | Pobocik | A61G 3/0209 414/462 |
| 4,354,791 A * | 10/1982 | Antonellis | B60N 2/062 280/304.1 |
| 4,365,924 A * | 12/1982 | Brigman | A61G 3/06 280/304.1 |
| 4,400,129 A * | 8/1983 | Eisenberg | A61G 3/0209 224/505 |
| 4,407,624 A * | 10/1983 | Kingston | B61D 47/00 414/546 |
| 4,457,663 A | 7/1984 | Hems | |
| 4,479,752 A * | 10/1984 | Todd | A61G 3/0209 180/333 |
| 4,483,653 A | 11/1984 | Waite | |
| 4,541,511 A * | 9/1985 | Muller | A61G 3/0209 280/189 |
| 4,566,842 A * | 1/1986 | Clarke | A61G 3/0209 414/462 |
| 5,096,361 A * | 3/1992 | Crawford | A61G 3/0209 414/462 |
| 5,110,173 A * | 5/1992 | Megna | A61G 3/06 296/65.04 |
| 5,466,111 A * | 11/1995 | Meyer | A61G 5/1059 280/250.1 |
| 5,540,539 A | 7/1996 | Wolfman | |
| 5,857,832 A * | 1/1999 | Al-Temen | B60N 2/245 280/727 |
| 6,050,356 A * | 4/2000 | Takeda | A61G 5/045 180/65.1 |
| 6,224,127 B1 * | 5/2001 | Hodge | B60P 3/14 182/150 |
| 6,416,272 B1 | 7/2002 | Suehiro et al. | |
| 6,821,078 B2 * | 11/2004 | Dudai | A61G 5/045 296/65.04 |
| 6,979,010 B1 * | 12/2005 | Kwapis | A61G 5/1059 280/250.1 |
| 7,404,505 B2 * | 7/2008 | Walther | A61G 3/0209 224/282 |
| 8,398,356 B2 * | 3/2013 | Sandoz | A61G 3/0808 414/541 |
| 8,733,833 B2 * | 5/2014 | Dickinson | B60N 2/2809 297/216.11 |
| 9,016,797 B2 * | 4/2015 | Iida | B60N 2/0252 280/250.1 |
| 9,039,028 B2 * | 5/2015 | Kobayashi | A61G 5/006 280/304.1 |
| 9,061,725 B1 * | 6/2015 | Nania | B62K 3/005 |
| 9,114,731 B2 * | 8/2015 | Horiguchi | B60N 2/0232 |
| 2014/0346836 A1 * | 11/2014 | Briggs | A61G 5/14 297/452.41 |
| 2016/0074261 A1 * | 3/2016 | Schoenian | A61G 3/062 414/462 |

* cited by examiner

WHEELCHAIR ASSEMBLY AND SYSTEM FOR INGRESS/EGRESS TO A VEHICLE USING A DOOR OF A VEHICLE AS SUPPORT

TECHNICAL FIELD

The present application generally relates to a wheelchair for handicapped or disabled individuals, and more specifically, to a wheelchair assembly and system that allows for ingress/egress to a vehicle without the need for an individual in the wheelchair assembly to dismount from the wheelchair seat and which allows for the wheelchair assembly to be positioned within the vehicle and allowing unobstructed deployment of an airbag within the vehicle.

BACKGROUND

Individuals who may be confined to a wheelchair may desire the ability to use motor vehicles such as passenger cars, vans, buses and trucks (hereinafter vehicles). The availability of hand controls for operating motor vehicles may provide disabled individuals confined to a wheelchair, a certain degree of autonomy by allowing them to operate the vehicle. With the ability to drive vehicles, individuals who may be confined to a wheelchair can experience a high degree of mobility and independence.

One problem facing the disabled driver, as well as wheelchair users riding as passengers, is entering and exiting the vehicle. Various wheelchair assist mechanisms have been developed which may allow for the lifting and positioning of the wheelchair into the vehicle. However, these wheelchair assist mechanisms may be costly and may add considerable weight to the vehicle. The added weight of the wheelchair assist mechanisms may adversely affecting the fuel economy of the vehicle.

Lifting mechanisms have been designed that may lift the individual confined to the wheelchair out of the wheelchair and into the vehicle. These types of lifting mechanisms may be costly and may add considerable weight to the vehicle. Further, these lifting mechanisms require either the individual in the wheelchair or another individual to fold and place the wheelchair in the vehicle.

Many vehicle safety systems such as airbags may be designed based on the proper positioning of a vehicle occupant in a deployment zone. Vehicle safety system may be deployed based on readings monitored by sensors located in the vehicle. For example, a vehicle seat sensor may indicate position and/or weight of the occupant in the vehicle seat. Present wheelchair assist mechanisms generally modify the vehicle by removing the vehicle seat. Thus, present wheelchair assist mechanisms may alter the effective operation of airbag deployment by blocking the deployment of the airbag.

Therefore, it would thus be desirable to provide a system and method that overcome the above problems by providing a wheelchair assist system that allows for easy ingress/egress to/from a vehicle and which allows for the deployment of an airbag within the vehicle.

SUMMARY

In accordance with one embodiment, an entry and exit assist system for a vehicle is disclosed. The system has a mounting slot formed within a door of the vehicle. A wheelchair has a set of wheels and a seat coupled to the set of wheels, wherein the set of wheels are one of detachable from or foldable under the wheelchair. A supporting connector is coupled to the wheelchair. The supporting connector slides into and engages the mounting slot holding the wheelchair above a ground area when the set of wheels are one of detached from or folded under the wheelchair. A seatback is slideably mounted on a track in the vehicle. When the supporting connector engages the mounting slot and holds the wheelchair above a ground area, closing the door positions the wheelchair in the vehicle. The seatback provides back support for a user of the wheelchair.

In accordance with one embodiment, an entry and exit assist system for a vehicle is disclosed. The system has a wheelchair comprising a set of wheels and a seat coupled to the set of wheels, wherein the set of wheels are one of detachable from or foldable under the wheelchair. A mounting slot is formed within a door of the vehicle. A supporting connector is coupled to the wheelchair. The supporting connector slides into and engages the mounting slot holding the wheelchair above a ground area when the set of wheels are one of detached from or folded under the wheelchair. A handle is formed in the door supporting the user when pulling the supporting connector into and along the mounting slot. A retractable support pedestal is coupled to a lower section of the door. A seatback is slideably mounted on a track in the vehicle. When the mounting slot and supporting connector holds a bottom section of the seat of the wheelchair at a height approximately even with a floor of the vehicle, closing the door with the supporting connector engaging the mounting slot and holding the wheelchair above a ground area positions the wheelchair in the vehicle. The seatback provides back support for a user of the wheelchair.

In accordance with one embodiment, a method of inserting and removing a wheelchair to and from a vehicle is disclosed. The method comprises: inserting a supporting connector of the wheelchair into a mounting slot on a door of the vehicle; removing wheels on the wheelchair; closing the door to position the wheelchair inside the vehicle; and adjusting a position of a vehicle seatback

BRIEF DESCRIPTION OF THE DRAWINGS

The present application is further detailed with respect to the following drawings. These figures are not intended to limit the scope of the present application but rather illustrate certain attributes thereof.

DESCRIPTION OF THE APPLICATION

Figure 1A:
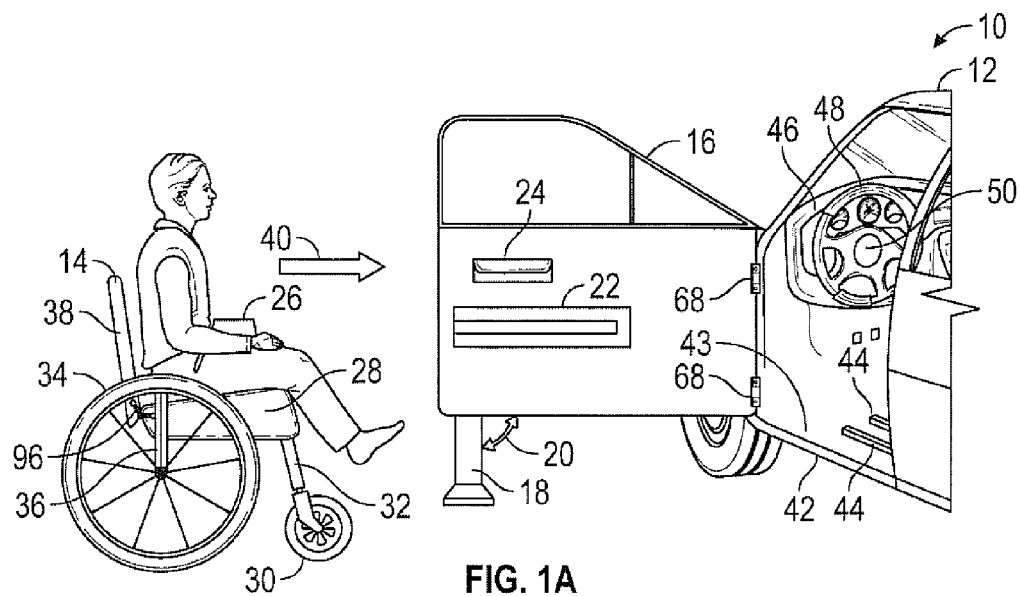
FIG. 1A is side view of a vehicle implementing an exemplary wheelchair assist system in accordance with one aspect of the present application.

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Referring to FIGS. 1A-1E, an exemplary wheelchair vehicle system 10 and method of implementation thereof may be seen. The system 10 may be implemented within a vehicle 12. The system 10 has a wheelchair 14 and may allow an occupant of the wheelchair 14 to enter and/or leave the vehicle 12 without the need to dismount from a seat 28 of the wheelchair 14. The system 10 may use the existing seat back 60 in the vehicle 12 to form the backing for the wheelchair 14 when the wheelchair 14 is placed in the vehicle to allow for the airbag to be deployed unobstructed.

The system 10 may use the door 16 of the vehicle 12 to aid in the ingress and egress to/from the vehicle 12. The door 16 may have an elongated slot 22. The slot 22 may be formed within the panel of the door 16. Alternatively, a beam member having a slot 22 formed therein may be coupled to the door 16. The slot 22 may be configured to engage and hold the wheelchair 14. The slot 22 may be positioned at a height on the door 16 so that when the slot 22 holds the wheelchair 14 a bottom section of the seat 28 of the wheelchair 14 is approximately at a same height as a floor 43 of the vehicle 12.

The wheelchair 14 may have a wheelchair connector 26. The wheelchair connector 26 may be used to engage and hold the wheelchair 14 within the slot 22. The wheelchair connector 26 may be part of an existing arm rest section of the wheelchair 14. The existing arm rest section may be reinforced to allow the wheelchair connector 26 to support a weight of the user. Alternatively, the wheelchair connector 26 may be a separate device attached to the wheelchair 14 to allow the wheelchair 14 to engage and be held in the slot 22.

Figure 1B:
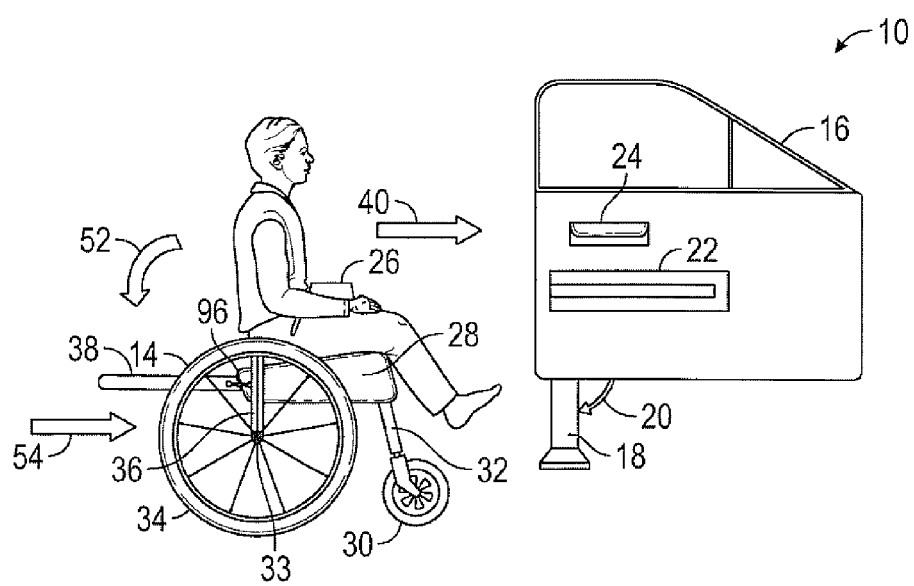
FIG. 1B is side view of the exemplary wheelchair assist system depicted in FIG. 1A with a seatback of the wheelchair in a reclined position in accordance with one aspect of the present application.

As shown in FIGS. 1A-1B, a user of the wheelchair 14 may roll themselves towards the slot 22 as symbolized by the arrow 40. A handle 24 may be formed in the door 16. The handle 16 may be used to allow the user to pull the wheelchair 14 towards and into the slot 22 when the wheelchair connector 26 is aligned with the slot 22. In accordance with one embodiment, a motorized track (not shown) may be formed in the elongated mounting slot 22. The motorized track may be use to pull the wheelchair 14 into the slot 22 once the wheelchair connector 26 engages the slot 22.

The system 10 may have a pedestal 18. The pedestal 18 may be retractable as shown by the bidirectional arrow 20. The pedestal 18 may extend and retract from a bottom section of the door 16. When the user is trying to engage the wheelchair connector 26 with the slot 22, the pedestal 18 may be lowered so that a bottom section of the pedestal 18 engages the ground. The pedestal 18 may be used to steady the door 16 during the engagement process, and to lessen the torsional loading and stress on the hinges 68 that join the door 16 to the vehicle 12. During the closing of the door 16, the pedestal 18 may be retracted back into the door 16 to allow the door 16 to close unimpeded.

The wheelchair 14 may have a seatback 38. A hinge mechanism 96 may be used to couple the seatback 38 to the seat 28 of the wheelchair 14. The hinge mechanism 96 may allow the seatback 38 to fold downward, as shown by arrow 52, and slide under into or under, as shown by arrow 54, the seat 28 of the wheelchair 14 as shown in FIG. 1B.

Figure 1C:
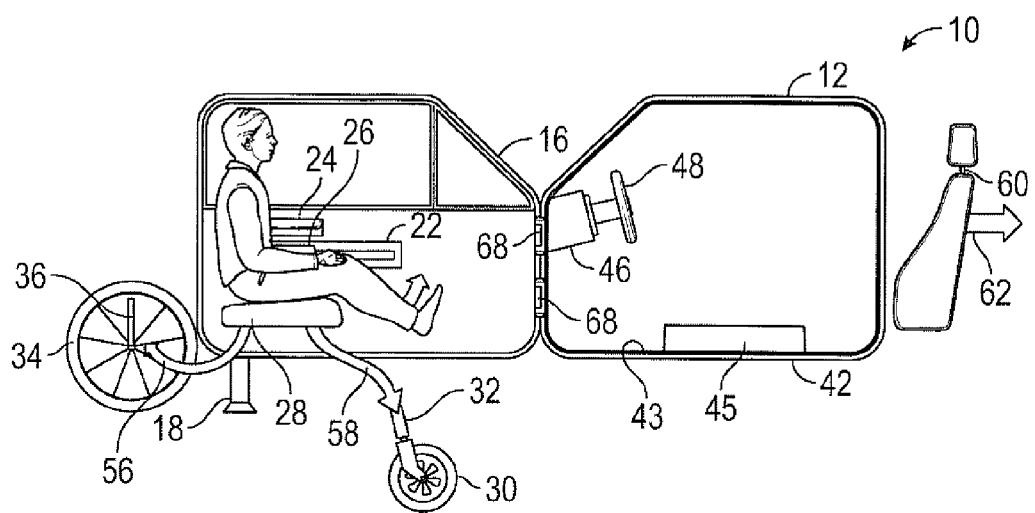
FIG. 1C is side view of the exemplary wheelchair assist system depicted in FIG. 1A with wheels of the wheelchair in a retracted/removed position in accordance with one aspect of the present application.

The wheelchair 14 in the embodiment shown in FIGS. 1A-1E has a pair of rear wheels 34 and a pair of front wheels 30 connected to frame posts 32 and 36 of the wheelchair 14. The pair of rear wheels 34 may be fixed so as to not swivel but to rotate about an axis 33. The pair of rear wheels 34 may be larger than the pair of front wheels 30 and may be used as drive wheels to move the wheelchair 14. The pair of front wheels 30 may be caster type wheels that may be used to change the direction of travel of the wheelchair 14. As shown in FIG. 1C, the front wheels 30 and rear wheels 34 may be removable as shown by the arrows 56 and 58. The front wheels 30 and rear wheels 34 may be detached from the frame posts 32 and 36 or portions of the frame post 32 and 36 supporting and holding the front wheels 30 and rear wheels 34. Alternatively, the front wheels 30 and rear wheels 34 may collapsible so as to fold under the wheelchair 14. The front wheels 30 and rear wheels 34 may be detached/folded under after the wheelchair 14 is secured to the door 16.

Figure 1D:
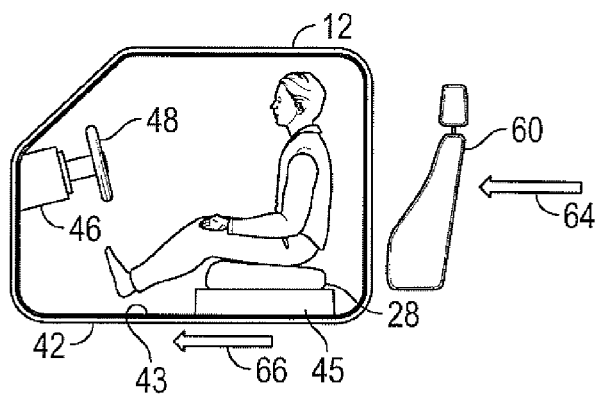
FIG. 1D is side view of the exemplary wheelchair assist system depicted in FIG. 1A with the wheelchair positioned within the vehicle and the seatback of the vehicle pushed back in accordance with one aspect of the present application.
Figure 1E:
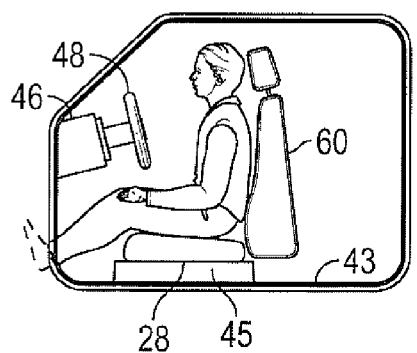
FIG. 1E is side view of the exemplary wheelchair assist system depicted in FIG. 1A with the wheelchair positioned within the vehicle and the seatback moved forwarded towards the driver of the vehicle in accordance with one aspect of the present application.

The system 10 may use the vehicle seatback 60 existing in the vehicle 12. As may be seen in FIGS. 1C-1E, the vehicle seatback 60 may be moved backwards, shown by arrow 62 and forwards, shown by arrow 64, on seating tracks 44 that are shown in FIG. 1A. The seatback 60 may be moved backwards during the insertion of the wheelchair seat 28 in the seating compartment 42. Once the user and the wheelchair seat 28 is situated in the seating compartment 42, the vehicle seatback 60 may be moved forward to a desired user position with respect to a dashboard 46 and steering wheel 48 of the vehicle 12 as shown in FIGS. 1D and 1E. The desired position of the vehicle seatback 60 may be stored as a memory seat setting for future ingress and egress from the vehicle 12 for a particular user. The seating profile may be communicated wirelessly via a key fob or other remote control device associated with a particular user.

The system 10 may have a platform 45. The platform 45 may be formed on the floor 43 of the vehicle 12. The platform 45 may be adjustable to raise and/or lower a height of the platform 45. The adjustability of the platform 45 may ensure that the bottom section of the seat 28 is in contact with and supported by the platform 45. Once the seat 28 is in contact with and supported by the platform 45, the adjustability of the platform 45 may allow the user to raise and/or lower the height of the seat 28 so that the user may see above the dashboard 46 and the surrounding area in front of the vehicle 12.

Figure 2A:
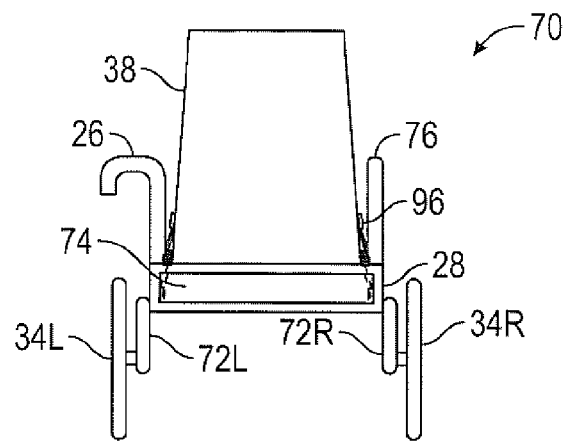
FIG. 2A is a rear view of an exemplary wheelchair used in the vehicle assist system depicted in FIG. 1A in accordance with one aspect of the present application.
Figure 2B:
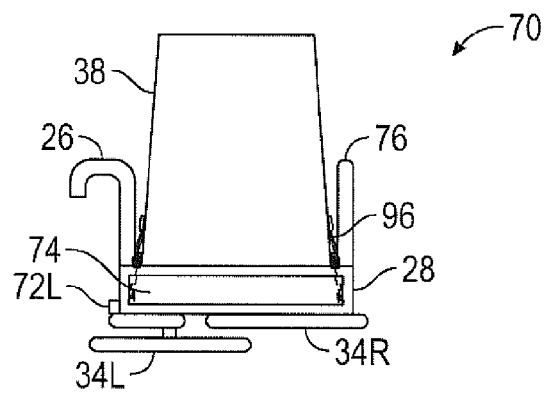
FIG. 2B is a rear view of the exemplary wheelchair depicted in FIG. 2A with the wheels of the wheelchair in a retracted position in accordance with one aspect of the present application.
Figure 2C:
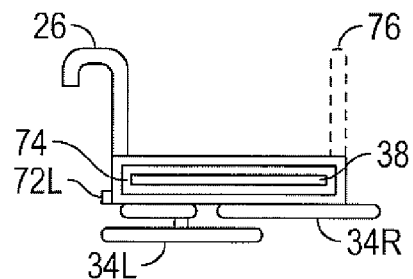
FIG. 2C is a rear view of the exemplary wheelchair depicted in FIG. 2A with the wheels of the wheelchair in a retracted position and a seatback of the wheelchair in a reclined position in accordance with one aspect of the present application.

Referring to FIGS. 2A-2C, one exemplary embodiment of a wheelchair 70 operative with the system 10 depicted in FIGS. 1A-1E may be seen. The wheelchair 70 may have a seat 28. A seatback 38 may be coupled to the seat 28. A rear left wheel 34L and a right wheel 34R may be connected to the wheelchair 70 with retractable and folding connectors 72L, 72R, respectively. The connectors 72L, 72R may rotate and/or swivel to allow the rear left and right wheels 72L, 72R to be placed under the wheelchair seat 28 as shown in FIG. 2B. The front wheels which may not be visible from the rear view shown, may also be connected with retractable and folding connectors to the wheelchair 70.

The seat 28 may have a slot 74 formed therein. The slot 74 may be used for stowing the seatback 38. A hinge mechanism 96 may be used to couple the seatback 38 to the seat 28. of the wheelchair 14. The hinge mechanism 96 may allow the seatback 38 to be placed in a retracted position and slide into the slot 74 as shown in FIG. 2C. Alternatively, the wheelchair 70 may be configured to have the seatback 38 detachable. In this embodiment, once the seatback 38 has been detached from the seat 28, the seatback 38 may be placed in the slot 74.

The wheelchair 70 may have one or more arm rests 76. The arm rest 76 may fold down as shown by the dotted outline 76 in FIG. 2C. The wheelchair connector 26 may be integrated to and form part of the arm rest 76. Alternatively, the wheelchair connector 26 may be a device separate from the arm rest 76. The wheelchair connector 26 may be used to allow the wheelchair 70 to engage the slot 22.

Figures 3A, 3B:
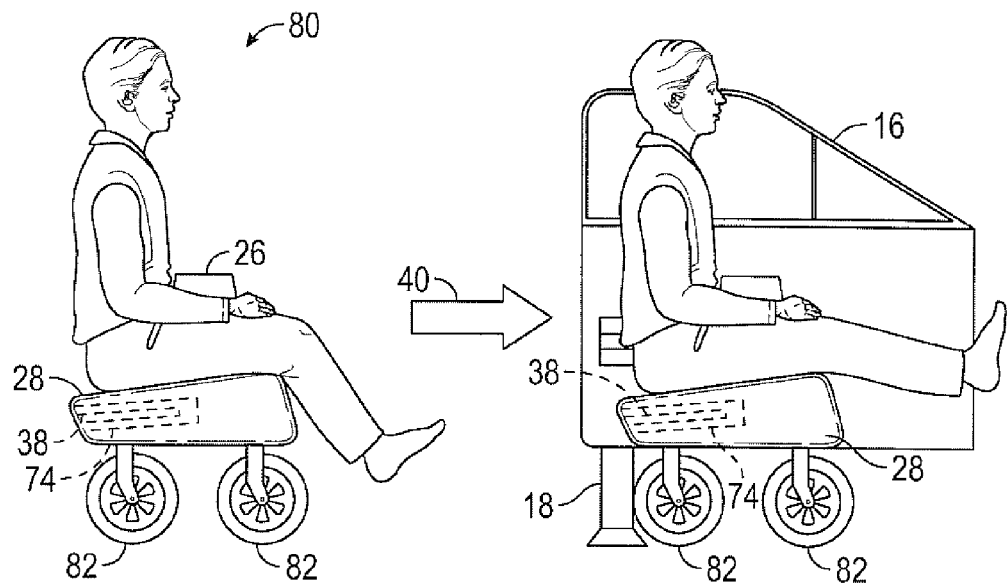
FIG. 3A is a side view of an exemplary wheelchair used in the vehicle assist system depicted in FIG. 1A in accordance with one aspect of the present application.
FIG. 3B is a side view of the exemplary wheelchair depicted in FIG. 3A attached to the vehicle assist system depicted in FIG. 1A in accordance with one aspect of the present application.

Referring to FIGS. 3A-3B, an exemplary embodiment of a wheelchair 80 operative with the system 10 depicted in FIGS. 1A-1E may be seen. The wheelchair 80 may have a seat 28. Wheels 82 may be coupled to the wheelchair 80 via frame post 36 and 38. The wheelchair 80 may be a self-propelled electrically driven wheelchair 80. The use of a motor to drive the wheels 82 may allow for the wheels 82 to be smaller in size, since the wheelchair occupant may not have to applying thrust with their arms to the wheels to move or propel the wheelchair 80 as is the case for wheelchair 70. As in previous embodiments, the wheelchair connector 26 may form part of the arm rest or may be a separate device to allow the wheelchair 80 to engage the slot 22.

The wheelchair 80 may have a seatback 38. If a seatback 38 is provided, the seatback 38 may be placed in a slot 74 formed in the seatback 38. A hinge mechanism 96 may be used to couple the seatback 38 to the seat 28. The hinge mechanism 96 may allow the seatback 38 to be placed in a retracted position and slide into the slot 74. Alternatively, the wheelchair 80 may be formed without a seatback 38.

A wheelchair connector 26 may be coupled or integral to the seat 28. The wheelchair connector 26 may be used to allow the wheelchair 70 to engage the slot 22.

Figure 4A:
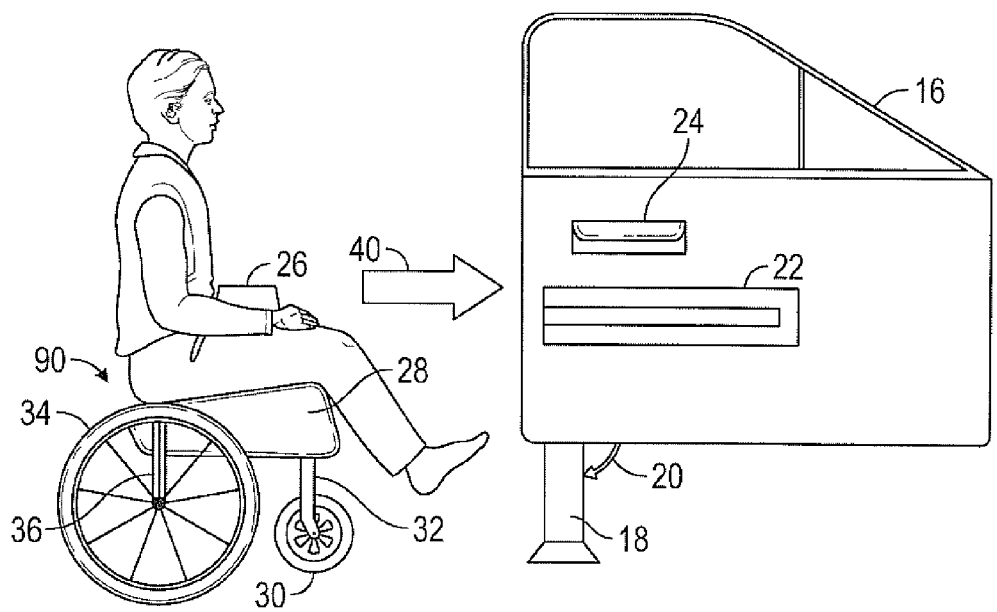
FIG. 4A is a side view of an exemplary wheelchair used in the vehicle assist system depicted in FIG. 1A in accordance with one aspect of the present application.
Figure 4B:
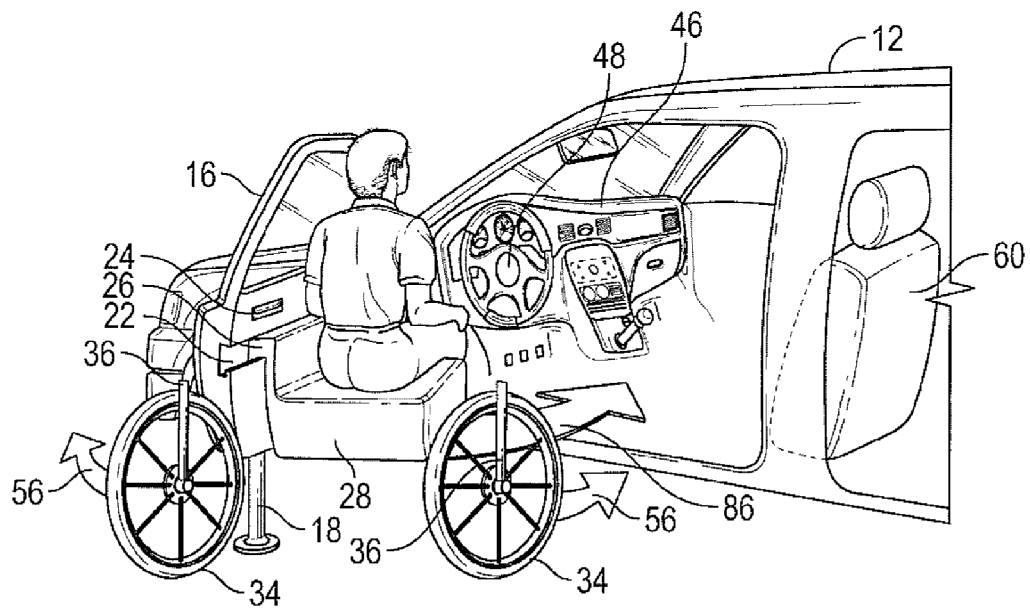
FIG. 4B is a rear view of the exemplary wheelchair assist system depicted in FIG. 4A in accordance with one aspect of the present application.

Referring to FIGS. 4A-4B, an exemplary embodiment of a wheelchair 90 operative with the system 10 depicted in FIGS. 1A-1E may be seen. The wheelchair 90 may have a seat 28 but is backless. The wheelchair 90 may have larger rear wheels 34 connected to the seat 28 via the frame post 36. The smaller front wheels 30 may be connected to the seat 28 via frame posts 32. As shown in FIG. 4B the front wheels 30 and rear wheels 34 may be removed from the wheelchair 90 as shown by the arrows 56 and 58 when the wheelchair 90 is secured to the door 16. Arrow 86 is illustrative of the swinging motion of the door 16 closing and placing the backless wheelchair seat 84 in the vehicle 12.

A wheelchair connector 26 may be coupled or integral to the seat 28. The wheelchair connector 26 may be used to allow the wheelchair 70 to engage the slot 22.

Figure 5:
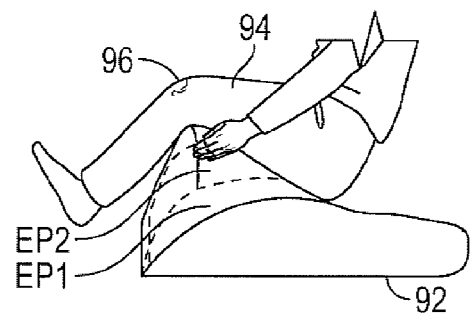
FIG. 5 is a side view of an exemplary expandable seat that lifts up the legs at the knee joint of a user with total paralysis during ingress and egress of the vehicle in accordance with one aspect of the present application.

Referring to FIG. 5, a side view of an exemplary wheelchair seat 92 may be shown. The seat 92 may be used with any of the wheelchairs 14, 70, 80 or 90. The seat 92 may expands to aid the user in lifting up the user's legs 94. The seat 92 may expands to aid in lifting up the user's legs 94 at a knee joint 96. The lifting of the legs 94 may allow for the legs 94 to clear a threshold of the vehicle seating compartment 42. The expansion of the wheelchair seat 92 may be accomplished with an inflatable bladder or a mechanical device. The expansion may be controlled by the wheelchair occupant, and may be expanded continuously or in steps such as expanded position one EP1 and expanded position two EP2.

The foregoing description is illustrative of particular embodiments of the application, but is not meant to be a limitation upon the practice thereof. The following claims, including all equivalents thereof, are intended to define the scope of the application.

What is claimed is:

1. An entry and exit assist system for a vehicle comprising:
   a mounting slot formed within a door of the vehicle;
   a wheelchair comprising:
      a set of wheels;
      a seat coupled to the set of wheels, wherein the set of wheels are one of detachable from or foldable under the wheelchair;
      a wheelchair seatback; and
      a sliding hinge coupled to the wheelchair seatback and the seat adjusting the wheelchair seatback from an upright to one of a position under or within the seat;
   a supporting connector coupled to the wheelchair, the supporting connector sliding into and engaging the mounting slot holding the wheelchair above a ground area when the set of wheels are one of detached from or folded under the wheelchair; and
   a seatback slideably mounted on a track in the vehicle;
   wherein closing the door with the supporting connector engaging the mounting slot and holding the wheelchair above a ground area positions the wheelchair in the vehicle, the seatback providing back support for a user of the wheelchair.

2. The system of claim 1, comprising a retractable support pedestal coupled to a lower section of the door.

3. The system of claim 1, comprising a handle formed in the door supporting the user when pulling the supporting connector into and along the mounting slot.

4. The system of claim 1, comprising one of a removable or a retractable wheelchair seatback.

5. The system of claim 1, wherein the wheelchair comprises a slot formed within the seat storing the wheelchair seatback when the wheelchair setback is position within the seat.

6. The system of claim 1, wherein the wheelchair comprises connectors coupled to the wheels and the wheelchair folding the wheels underneath the wheelchair.

7. The system of claim 1, wherein the seat of the wheelchair expands lifting and moving legs of the user.

8. The system of claim 1, comprising an adjustable platform coupled to a floor of the vehicle raising and lowering the seat of the wheelchair when positioned in the vehicle.

9. The system of claim 1, wherein the mounting slot and supporting connector holding a bottom section of the seat of the wheelchair at a height approximately even with a floor of the vehicle.

10. An entry and exit assist system for a vehicle comprising:
   a wheelchair comprising:
      a set of wheels;
      a seat coupled to the set of wheels, wherein the set of wheels are one of detachable from or foldable under the wheelchair;
      a wheelchair seatback; and
      a sliding hinge coupled to the wheelchair seatback and the seat adjusting the wheelchair seatback from an upright to one of a position under or within the seat;
   a mounting slot formed within a door of the vehicle;
   a supporting connector coupled to the wheelchair, the supporting connector sliding into and engaging the mounting slot holding the wheelchair above a ground area when the set of wheels are one of detached from or folded under the wheelchair;
   a handle formed in the door supporting the user when pulling the supporting connector into and along the mounting slot;
   a retractable support pedestal coupled to a lower section of the door; and
   a seatback slideably mounted on a track in the vehicle;
   wherein the mounting slot and supporting connector holding a bottom section of the seat of the wheelchair at a height approximately even with a floor of the vehicle, closing the door with the supporting connector engaging the mounting slot and holding the wheelchair above a ground area positions the wheelchair in the vehicle, the seatback providing back support for a user of the wheelchair.

11. The system of claim 10, wherein the wheelchair comprises a slot formed within the seat storing the wheelchair seatback when the wheelchair setback is position within the seat.

12. The system of claim 10, wherein the wheelchair comprises connectors coupled to the wheels and the wheelchair folding the wheels underneath the wheelchair.

13. The system of claim 10, wherein the seat of the wheelchair expands lifting and moving legs of the user.

14. The system of claim 10, comprising an adjustable platform coupled to a floor of the vehicle raising and lowering the seat of the wheelchair when positioned in the vehicle.

15. An entry and exit assist system for a vehicle comprising:
   a mounting slot formed within a door of the vehicle;
   a wheelchair comprising:
      a set of wheels;
      a seat coupled to the set of wheels, wherein the set of wheels are one of detachable from or foldable under the wheelchair; and
      connectors coupled to the wheels and the wheelchair folding the wheels underneath the wheelchair;
   a supporting connector coupled to the wheelchair, the supporting connector sliding into and engaging the mounting slot holding the wheelchair above a ground area when the set of wheels are one of detached from or folded under the wheelchair; and
   a seatback slideably mounted on a track in the vehicle;
   wherein closing the door with the supporting connector engaging the mounting slot and holding the wheelchair above a ground area positions the wheelchair in the vehicle, the seatback providing back support for a user of the wheelchair.

16. An entry and exit assist system for a vehicle comprising:
   a wheelchair comprising:
      a set of wheels;
      a seat coupled to the set of wheels, wherein the set of wheels are one of detachable from or foldable under the wheelchair; and
      connectors coupled to the wheels and the wheelchair folding the wheels underneath the wheelchair;
   a mounting slot formed within a door of the vehicle;
   a supporting connector coupled to the wheelchair, the supporting connector sliding into and engaging the mounting slot holding the wheelchair above a ground area when the set of wheels are one of detached from or folded under the wheelchair;
   a handle formed in the door supporting the user when pulling the supporting connector into and along the mounting slot;
   a retractable support pedestal coupled to a lower section of the door; and
   a seatback slideably mounted on a track in the vehicle;
   wherein the mounting slot and supporting connector holding a bottom section of the seat of the wheelchair at a height approximately even with a floor of the vehicle, closing the door with the supporting connector engaging the mounting slot and holding the wheelchair above a ground area positions the wheelchair in the vehicle, the seatback providing back support for a user of the wheelchair.

17. An entry and exit assist system for a vehicle comprising:
   a mounting slot formed within a door of the vehicle;
   a wheelchair comprising:
      a set of wheels; and
      a seat coupled to the set of wheels, wherein the set of wheels are one of detachable from or foldable under the wheelchair;
   a supporting connector coupled to the wheelchair, the supporting connector sliding into and engaging the mounting slot holding the wheelchair above a ground area when the set of wheels are one of detached from or folded under the wheelchair;
   a seatback slideably mounted on a track in the vehicle; and
   an adjustable platform coupled to a floor of the vehicle raising and lowering the seat of the wheelchair when positioned in the vehicle;

wherein closing the door with the supporting connector engaging the mounting slot and holding the wheelchair above a ground area positions the wheelchair in the vehicle, the seatback providing back support for a user of the wheelchair.

18. An entry and exit assist system for a vehicle comprising:
   a wheelchair comprising:
      a set of wheels; and
      a seat coupled to the set of wheels, wherein the set of wheels are one of detachable from or foldable under the wheelchair;
   a mounting slot formed within a door of the vehicle;
   a supporting connector coupled to the wheelchair, the supporting connector sliding into and engaging the mounting slot holding the wheelchair above a ground area when the set of wheels are one of detached from or folded under the wheelchair;
   a handle formed in the door supporting the user when pulling the supporting connector into and along the mounting slot;
   a retractable support pedestal coupled to a lower section of the door;
   a seatback slideably mounted on a track in the vehicle; and
   an adjustable platform coupled to a floor of the vehicle raising and lowering the seat of the wheelchair when positioned in the vehicle;
   wherein the mounting slot and supporting connector holding a bottom section of the seat of the wheelchair at a height approximately even with a floor of the vehicle, closing the door with the supporting connector engaging the mounting slot and holding the wheelchair above a ground area positions the wheelchair in the vehicle, the seatback providing back support for a user of the wheelchair.

* * * * *